(12) United States Patent
Root et al.

(10) Patent No.: US 6,681,295 B1
(45) Date of Patent: Jan. 20, 2004

(54) FAST LANE PREFETCHING

(75) Inventors: Stephen C. Root, Westborough, MA (US); Richard E. Kessler, Shrewsbury, MA (US); David H. Asher, Sutton, MA (US); Brian Lilly, Marlborough, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 565 days.

(21) Appl. No.: 09/652,451

(22) Filed: Aug. 31, 2000

(51) Int. Cl.[7] .............................................. G06F 12/00

(52) U.S. Cl. ...................... 711/128; 711/133; 711/134; 711/136

(58) Field of Search ................................ 711/128, 133, 711/136, 134

(56) References Cited

U.S. PATENT DOCUMENTS

| | | | |
|---|---|---|---|
| 5,261,066 A | 11/1993 | Jouppi et al. | 711/122 |
| 5,317,718 A | 5/1994 | Jouppi | 711/137 |
| 5,758,183 A | 5/1998 | Scales | 711/148 |
| 5,761,729 A | 6/1998 | Scales | 711/148 |
| 5,787,480 A | 7/1998 | Scales et al. | 711/148 |
| 5,802,585 A | 9/1998 | Scales et al. | 711/154 |
| 5,809,450 A | 9/1998 | Chrysos et al. | 702/186 |
| 5,875,151 A | 2/1999 | Mick | 365/233 |
| 5,890,201 A | 3/1999 | McLellan et al. | 711/108 |
| 5,893,931 A | 4/1999 | Peng et al. | 711/206 |
| 5,918,250 A | 6/1999 | Hammond | 711/205 |
| 5,918,251 A | 6/1999 | Yamada et al. | 711/207 |
| 5,923,872 A | 7/1999 | Chrysos et al. | 395/591 |
| 5,950,228 A | 9/1999 | Scales et al. | 711/148 |
| 5,964,867 A | 10/1999 | Anderson et al. | 712/219 |
| 5,983,325 A | 11/1999 | Lewchuk | 711/137 |
| 6,000,044 A | 12/1999 | Chrysos et al. | 714/47 |
| 6,070,227 A | 5/2000 | Rokicki | 711/117 |
| 6,085,300 A | 7/2000 | Sunaga et al. | 711/168 |
| 6,105,111 A * | 8/2000 | Hammarlund et al. | 711/136 |
| 6,185,657 B1 * | 2/2001 | Moyer | 711/128 |
| 6,202,129 B1 * | 3/2001 | Palanca et al. | 711/133 |
| 6,405,287 B1 * | 7/2002 | Lesartre | 711/128 |
| 6,542,966 B1 * | 4/2003 | Srawford et al. | 711/133 |
| 6,560,676 B1 * | 5/2003 | Nishimoto | 711/128 |

OTHER PUBLICATIONS

*Alpha Architecture Reference Manual*, Third Edition, The Alpha Architecture Committee, 1998 Digital Equipment Corporation (21 p.), in particular pp. 3–1 through 3–15.
*A Logic Design Structure For LSI Testability*, E. B. Eichelberger et al., 1977 IEEE (pp. 462–468).
*Direct RDRAM™256/288–Mbit (512Kx16/18x32s)*, Preliminary Information Document DL0060 Version 1.01 (69 p.).

(List continued on next page.)

Primary Examiner—Donald Sparks
Assistant Examiner—Ngoc V Dinh (57) ABSTRACT

A computer system has a set-associative, multi-way cache system, in which at least one way is designated as a fast lane, and remaining way(s) are designated slow lanes. Any data that needs to be loaded into cache, but is not likely to be needed again in the future, preferably is loaded into the fast lane. Data loaded into the fast lane is earmarked for immediate replacement. Data loaded into the slow lanes preferably is data that may not needed again in the near future. Slow data is kept in cache to permit it to be reused if necessary. The high-performance mechanism of data access in a modem microprocessor is with a prefetch; data is moved, with a special prefetch instruction, into cache prior to its intended use. The prefetch instruction requires less machine resources, than carrying out the same intent with an ordinary load instruction. So, the slow-lane, fast-lane decision is accomplished by having a multiplicity of prefetch instructions. By loading "not likely to be needed again" data into the fast lane, and designating such data for immediate replacement, data in other cache blocks, in the other ways, may not be evicted, and overall system performance is increased.

17 Claims, 5 Drawing Sheets

OTHER PUBLICATIONS

*Testability Features of AMD–K6™Microprocessor*, R. S. Fetherston et al., Advanced Micro Devices (8 p.).

*Hardware Fault Containment in Scalable Shared–Memory Multiprocessors*, D. Teodosiu et al., Computer Systems Laboratory, Stanford University (12 p.), 1977.

*Cellular Disco: resource management using virtual clusters on shared–memory multiprocessors*K. Govil et al., 1999 ACM 1–58113–140–2/99/0012 (16 p.).

*Are Your PLDs Metastable?*, Cypress Semiconductor Corporation, Mar. 6, 1997 (19 p.).

*Rambus® RIMM™Module (with 128/144Mb RDRAMs)*, Preliminary Information, Document DL0084 Version 1.1 (12 p.).

*Direct Rambus™RIMM™Module Specification Version 1.0*, Rambus Inc., SL–0006–100 (32 p.), 2000.

*End–To–End Fault Containment In Scalable SharedMemory Multiprocessors*, D. Teodosiu, Jul. 2000 (148 p.).

\* cited by examiner

FAST LANE PREFETCHING

CROSS-REFERENCE TO RELATED APPLICATIONS

This application relates to the following commonly assigned co-pending applications entitled:

"Apparatus And Method For Interfacing A High Speed Scan-Path With Slow-Speed Test Equipment," Ser. No. 09/653642, filed Aug. 31, 2000, "Priority Rules For Reducing Network Message Routing Latency," Ser. No. 09/652,322, filed Aug. 31, 2000, "Scalable Directory Based Cache Coherence Protocol," Ser. No. 09/652,703, filed Aug. 31, 2000, "Scalable Efficient I/O Port Protocol," Ser. No. 09/652,391, filed Aug. 31, 2000, "Efficient Translation Lookaside Buffer Miss Processing In Computer Systems With A Large Range Of Page Sizes," Ser. No. 09/652,552, filed Aug. 31, 2000, "Fault Containment And Error Recovery Techniques In A Scalable Multiprocessor," Ser. No. 09/651,949, filed Aug. 31, 2000, "Speculative Directory Writes In A Directory Based Cache Coherent Non uniform Memory Access Protocol," Ser. No. 09/652,834, filed Aug. 31, 2000, "Special Encoding Of Known Bad Data," Ser. No. 09/652,314, filed Aug. 31, 2000, "Broadcast Invalidate Scheme," Ser. No. 09/652,165, filed Aug. 31, 2000, "Mechanism To Track All Open Pages In A DRAM Memory System," Ser. No. 09/652,704, filed Aug. 31, 2000, "Programmable DRAM Address Mapping Mechanism," Ser. No. 09/653,093, filed Aug. 31, 2000, "Computer Architecture And System For Efficient Management Of Bi-Directional Bus," Ser. No. 09/652,323, filed Aug. 31, 2000, "An Efficient Address Interleaving With Simultaneous Multiple Locality Options," Ser. No. 09/652,452, filed Aug. 31, 2000, "A High Performance Way Allocation Strategy For A Multi-Way Associative Cache System," Ser. No. 09/653,092, filed Aug. 31, 2000, "Method And System For Absorbing Defects In High Performance Microprocessor With A Large N-Way Set Associative Cache," Ser. No. 09/651,948, filed Aug. 31, 2000, "A Method For Reducing Directory Writes And Latency In A High Performance, Directory-Based, Coherency Protocol," Ser. No. 09/652,324 filed Aug. 31, 2000, "Mechanism To Reorder Memory Read And Write Transactions For Reduced Latency And Increased Bandwidth," Ser. No. 09/653,094, filed Aug. 31, 2000, "System For Minimizing Memory Bank Conflicts In A Computer System," Ser. No. 09/652,325, filed Aug. 31, 2000, "Computer Resource Management And Allocation System," Ser. No. 09/651,945, filed Aug. 31, 2000, "Input Data Recovery Scheme," Ser. No. 09/653,643, filed Aug. 31, 2000, "Mechanism For Synchronizing Multiple Skewed Source-Synchronous Data Channels With Automatic Initialization Feature," Ser. No. 09/652,480, filed Aug. 31, 2000, "Mechanism To Control The Allocation Of An N-Source Shared Buffer," Ser. No. 09/651,924, filed Aug. 31, 2000, and, "Chaining Directory Reads And Writes To Reduce DRAM Bandwidth In A Directory Based CC-NUMA Protocol," Ser. No. 09/652,315, filed Aug. 31, 2000, all of which are incorporated by reference herein.

STATEMENT REGARDING FEDERALLY SPONSORED RESEARCH OR DEVELOPMENT

Not applicable.

BACKGROUND OF THE INVENTION

Field of the Invention

The present invention generally relates to a microprocessor. More particularly, the invention relates to prefetching instructions. Still more particularly, the invention relates to prefetching data into designated ways of a set-associative cache.

Background of the Invention

Most modern computer systems include at least one central processing unit ("CPU") and a main memory. Multiprocessor systems include more than one processor and each processor typically has its own memory which may or may not be shared by other processors. The speed at which the CPU can decode and execute instructions and operands depends upon the rate at which the instructions and operands can be transferred from main memory to the CPU. In an attempt to reduce the time required for the CPU to obtain instructions and operands from main memory, many computer systems include a cache memory coupled between the CPU and main memory.

A cache memory is a relatively small, high-speed memory (compared to main memory) buffer which is used to hold temporarily those portions of the contents of main memory which it is believed will be used in the near future by the CPU. The main purpose of a cache is to shorten the time necessary to perform memory accesses, both for data and instructions. Cache memory typically has access times that are significantly faster than a system's main memory. The use of cache memory can significantly improve system performance by reducing data access time, therefore permitting the CPU to spend far less time waiting for instructions and operands to be fetched and/or stored.

A cache memory, typically comprising some form of random access memory ("RAM") includes many blocks (also called lines) of one or more words of data. Associated with each cache block in the cache is a tag. The tag provides information for mapping the cache line data to its main memory address. Each time the processor makes a memory reference (i.e., read or write), a tag value from the memory address is compared to the tags in the cache to see if a copy of the requested data resides in the cache. If the desired memory block resides in the cache, then the cache's copy of the data is used in the memory transaction, instead of the main memory's copy of the same data block. However, if the desired data block is not in the cache, the block must be retrieved from the main memory and supplied to the processor. A copy of the data also is stored in the cache. Commonly used mapping functions include direct mapping and associative mapping techniques.

In a modern computer system, latency to move instructions and operands into the cache is a significant performance issue. One of the key optimizations to deal with this issue is "prefetch." The data to be retrieved is moved into the cache before it is actually needed. This is called a prefetch. In a modem computer system, specific instruction(s) are provided to do the prefetch. The time at which to do the prefetch depends on a number parameters of the hardware, and, indeed, the program itself. Deciding when to do the prefetch is not the subject of this disclosure.

In a multi-way set-associative cache the cache comprises a plurality of buffers referred to as "ways" (also called "sets"). Each way comprises a plurality of cache blocks and associated tags. A portion of a memory address is an "index" value. The index value from the memory address references corresponding cache blocks and their tags in the cache. For example, an index of 3 may reference the third cache block and associated tag in each of the ways. A "multi-way" cache has more than one way. A cache with two ways is called a two-way, set associative cache. Similarly, a cache with four ways is called a four-way, set associative cache.

When a multi-way access is made, a comparison is made of the tags in each array corresponding to the address's index value to a tag value in the address itself. A match means that the desired data block is currently in a particular way in the cache and the operation is performed on or with the data from that particular way.

Because the cache stores only a subset of the memory data, for each memory reference the requested data may or may not be currently stored in the cache. When the data is currently in the cache, there is a "hit" in the cache, as described above. When the data is not already in the cache, the requested data must be fetched from memory. The data fetched from memory is used in the transaction by the CPU and a copy of that data is placed in cache for subsequent use. This condition in which the needed data is not in cache is called a cache "miss." Upon a cache miss, if the cache is currently full, space must be allocated in the cache to provide storage for the data received from main memory. Of course, if the cache is full which typically occurs shortly after system initialization as the system begins normal operation, a block of data in cache must be "evicted" to make room for the new data block. The process of determining which cache block to "evict" is called "allocation."

One type of allocation scheme is the Least Recently Used ("LRU") technique of allocation. In LRU allocation, a temporal indicator is stored for each cache block when data is written into the cache location. This temporal indicator serves as a so-called "time-stamp" because it provides a temporal characteristic to the stored data. In general, the time-stamp is used to determine which data in the cache has been used least recently. The LRU allocation technique evicts the least recently used cache block to make room for the new block. The LRU technique is based on the assumption that data that has not been used recently is less likely to be needed again compared to data that has been used more recently. Often, this assumption proves to be accurate, and other times even the least recently used cache block will be needed again after eviction. Performance testing has demonstrated, however, that on balance the LRU allocation technique achieves a better latency reduction than many other allocation techniques.

In an LRU-type allocation scheme, the most recently used cache block will remain in cache until it becomes the oldest (i.e., least recently used) block in the cache. This means that, in the interim, while that block remains in cache, other cache blocks necessarily will be evicted instead. However, it may be that a block that is not evicted because it is not the least recently used block will never again be used, while other blocks that may be needed again. Unfortunately, LRU-type allocation schemes keep more recently used blocks in the cache even if they will never again be needed or at least not needed any time soon. Retaining recently used, but unneeded, blocks in cache forces the allocation logic to evict other blocks that actually might be needed, thereby reducing the performance of the system.

Accordingly, it would be desirable to have a cache system and allocation scheme that addresses this deficiency. To date, no such system is known to exist.

BRIEF SUMMARY OF THE INVENTION

The problems noted above are solved in large part by a computer system having a set-associative, multi-way cache system in which at least one way is designated as a fast lane and the remaining way(s) are designated slow lanes. Any data that needs to be loaded into cache, but is not likely to be needed again in the near future preferably is loaded into the fast lane. Data loaded into the fast lane is earmarked for immediate replacement. Data loaded into the slow lanes preferably is data that may be needed again in the near future. Slow data is kept in cache to permit it to be reused if necessary. Prefetch command data is one type of data that may not be needed again and can be placed into the fast lane. By loading "not likely to be needed again" data into the fast lane and designating such data for immediate replacement, data in other cache blocks in the other ways may not be evicted and overall system performance is increased.

The cache system of the present invention preferably implements two cache allocation schemes. One scheme is used to allocate the slow ways and a different scheme is used for the fast way. Further, two or more fast lanes can be provided if desired.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

The terms "eviction," "allocation," and "replacement" are generally used synonymously in this disclosure to refer to process of freeing up a cache block in cache for new cache data.

DETAILED DESCRIPTION OF THE PREFERRED EMBODIMENTS

Applicants have recognized that certain types of data are not likely to be needed again in the near future. For example, data accessed in a linear fashion in a software control loop will not be immediately accessed again if that loop is large. As modem computer systems become more powerful, they are utilized on larger and larger problems, with larger and larger data sets. So data reuse becomes less likely. This linearly accessed, or "streaming" data, is a prime candidate for occupancy in a "fast" lane of a multi-way cache.

A typical scenario in a software control loop is for the loop to include an instruction that reads (also called "loads") the data. Data arrives into a register in the central processing unit ("CPU"). Data may have been retrieved from memory, a cache, (or even more remotely, from disk storage). The memory address for the load is contained in a pointer (which is preferably in a register). The pointer value is typically incremented by another instruction so that on the next pass through the loop, the subsequent memory address will be loaded into the CPU.

A prefetch instruction (inserted by the compiler, or a programmer) can be used in tandem with the load instruction. The prefetch instruction initiates the retrieval of data to be loaded in a future loop iteration so that the load does not absorb the full latency penalty of the data fetch.

There may be other data, besides this streaming data, required by the software. In a technique called "blocking," part of the data is kept in a cache, to enter into computations with the streaming data, which is not kept in the cache. Blocking reduces the amount of memory traffic per computation. This cache resident data also can be prefetched. This cache resident, "blocking" data, is a prime candidate for occupancy in a "slow" lane of a multi-way cache. The compiler, or programmer, can then signal to the computer system, the distinction between streaming data and blocking data by the choice of prefetch utilized to make that data cache resident.

Some compilers are able to "block" a computation problem to gain significant performance. Further performance, can then be obtained by controlling the fast-lane/slow-lane cache behavior by prefetch type selection.

In a conventional cache system, with LRU, the blocking data is swept out of the cache by the streaming data, and thus will have to be reloaded for use. Problems have been observed, wherein there were nine input data streams so that the blocking data was repeatedly evicted in a conventional cache system. In the preferred embodiment of the invention, however, the blocking data can remain cache resident for a significant performance increase.

The following explanation includes a description of a processor design in accordance with the preferred embodiment of the invention. Following a review of the overall design of the processor, additional description of the cache subsystem and allocation scheme will be provided.

Figure 1A:
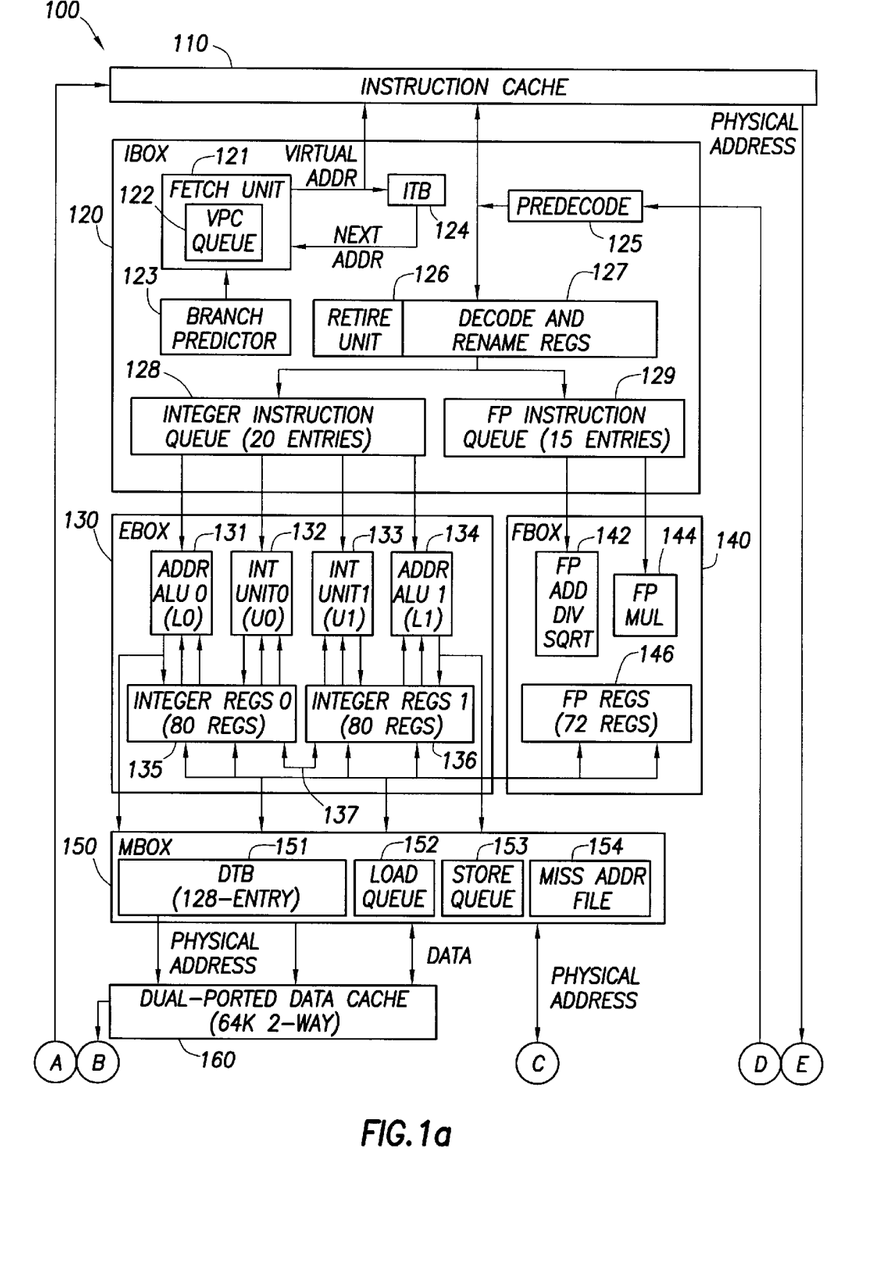
FIG. 1a and 1b show a block diagram of a microprocessor configured in accordance with the preferred embodiment of the invention.
Figure 1B:
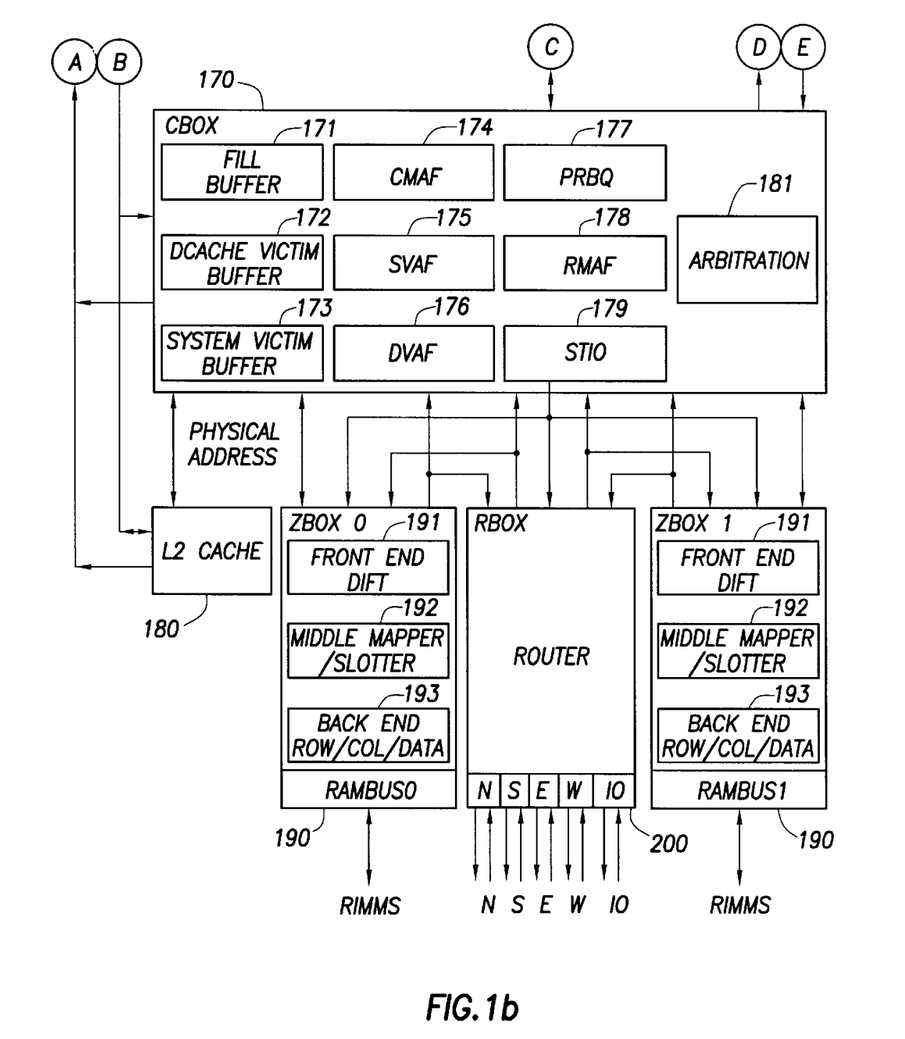

Referring now to FIGS. 1a and 1b, a processor 100 constructed in accordance with the preferred embodiment includes an instruction cache 110, an instruction fetch, issue and retire unit ("Ibox") 120, an integer execution unit ("Ebox") 130, a floating-point execution unit ("Fbox") 140, a memory reference unit ("Mbox") 150, a data cache 160, an L2 instruction and data cache control unit ("Cbox") 170, a level L2 cache 180, two memory controllers ("Zbox0" and "Zbox1") 190, and an interprocessor and I/O router unit ("Rbox") 200. The following discussion describes each of these units.

Each of the various functional units 110–200 contains control logic that communicate with various other functional units control logic as shown. The instruction cache control logic 110 communicates with the Ibox 120, Cbox 170, and L2 Cache 180. In addition to the control logic communicating with the instruction cache 110, the Ibox control logic 120 communicates with Ebox 130, Fbox 140 and Cbox 170. The Ebox 130 and Fbox 140 control logic both communicate with the Mbox 150, which in turn communicates with the data cache 160 and Cbox 170. The Cbox control logic also communicates with the L2 cache 180, Zboxes 190, and Rbox 200.

Referring still to FIGS. 1a and 1b, the Ibox 120 preferably includes a fetch unit 121 which contains a virtual program counter("VPC") 122, a branch predictor 123, an instruction-stream translation buffer 124, an instruction predecoder 125, a retire unit 126, decode and rename registers 127, an integer instruction queue 128, and a floating point instruction queue 129. Generally, the VPC 122 maintains virtual addresses for instructions that are in flight. An instruction is said to be "in-flight" from the time it is fetched until it retires or aborts. The Ibox 120 can accommodate as many as 80 instructions, in 20 successive fetch slots, in flight between the decode and rename registers 127 and the end of the pipeline. The VPC preferably includes a 20-entry table to store these fetched VPC addresses.

The branch predictor 123 is used by the Ibox 120 with regard to branch instructions. A branch instruction requires program execution either to continue with the instruction immediately following the branch instruction if a certain condition is met, or branch to a different instruction if the particular condition is not met. Accordingly, the outcome of a branch instruction is not known until the instruction is executed. In a pipelined architecture, a branch instruction (or any instruction for that matter) may not be executed for at least several, and perhaps many, clock cycles after the fetch unit in the processor fetches the branch instruction. In order to keep the pipeline full, which is desirable for efficient operation, the processor includes branch prediction logic that predicts the outcome of a branch instruction before it is actually executed (also referred to as "speculating"). The branch predictor 123, which receives addresses from the VPC queue 122, preferably bases its speculation on short and long-term history of prior instruction branches. As such, using branch prediction logic, a processor's fetch unit can speculate the outcome of a branch instruction before it is actually executed. The speculation, however, may or may not turn out to be accurate. That is, the branch predictor logic may guess wrong regarding the direction of program execution following a branch instruction. If the speculation proves to have been accurate, which is determined when the processor executes the branch instruction, then the next instructions to be executed have already been fetched and are working their way through the pipeline.

If, however, the branch speculation performed by the branch predictor 123 turns out to have been the wrong prediction (referred to as "misprediction" or "misspeculation"), many or all of the instructions behind the branch instruction may have to be flushed from the pipeline (i.e., not executed) because of the incorrect fork taken after the branch instruction. Branch predictor 123 uses any suitable branch prediction algorithm, however, that results in correct speculations more often than misspeculations, and the overall performance of the processor is better (even in the face of some misspeculations) than if speculation was turned off.

The instruction translation buffer ("ITB") 124 couples to the instruction cache 110 and the fetch unit 121. The ITB 124 comprises a 128-entry, fully-associative instruction-stream translation buffer that is used to store recently used instruction-stream address translations and page protection information. Preferably, each of the entries in the ITB 124 may be 1, 8, 64 or 512 contiguous 8-kilobyte ("KB") pages or 1, 32, 512, 8192 contiguous 64-kilobyte pages. The allocation scheme used for the ITB 124 is a round-robin scheme, although other schemes can be used as desired.

The predecoder 125 reads an octaword (16 contiguous bytes) from the instruction cache 110. Each octaword read from instruction cache may contain up to four naturally aligned instructions per cycle. Branch prediction and line prediction bits accompany the four instructions fetched by the predecoder 125. The branch prediction scheme implemented in branch predictor 123 generally works most efficiently when only one branch instruction is contained among the four fetched instructions. The predecoder 125 predicts the instruction cache line that the branch predictor 123 will generate. The predecoder 125 generates fetch requests for additional instruction cache lines and stores the instruction stream data in the instruction cache.

Referring still to FIGS. 1a and 1b, the retire unit 126 fetches instructions in program order, executes them out of order, and then retires (also called "committing" an instruction) them in order. The Ibox 120 logic maintains the architectural state of the processor by retiring an instruction only if all previous instructions have executed without generating exceptions or branch mispredictions. An exception is any event that causes suspension of normal instruction execution. Retiring an instruction commits the processor to any changes that the instruction may have made to the software accessible registers and memory. The processor 100 preferably includes the following three machine code accessible hardware: integer and floating-point registers, memory, internal processor registers. The retire unit 126 of the preferred embodiment can retire instructions at a sustained rate of eight instructions per cycle, and can retire as many as 11 instructions in a single cycle.

The decode and rename registers 127 contains logic that forwards instructions to the integer and floating-point instruction queues 128, 129. The decode and rename registers 127 perform preferably the following two functions. First, the decode and rename registers 127 eliminates register write-after-read ("WAR") and write-after-write ("WAW") data dependency while preserving true read-after-write ("RAW") data dependencies. This permits instructions to be dynamically rescheduled. Second, the decode and rename registers 127 permits the processor to speculatively execute instructions before the control flow previous to those instructions is resolved.

The logic in the decode and rename registers 127 preferably translates each instruction's operand register specifiers from the virtual register numbers in the instruction to the physical register numbers that hold the corresponding architecturally-correct values. The logic also renames each instruction destination register specifier from the virtual number in the instruction to a physical register number chosen from a list of free physical registers, and updates the register maps. The decode and rename register logic can process four instructions per cycle. Preferably, the logic in the decode and rename registers 127 does not return the physical register, which holds the old value of an instruction's virtual destination register, to the free list until the instruction has been retired, indicating that the control flow up to that instruction has been resolved.

If a branch misprediction or exception occurs, the register logic backs up the contents of the integer and floating-point rename registers to the state associated with the instruction that triggered the condition, and the fetch unit 121 restarts at the appropriate Virtual Program Counter ("VPC"). Preferably, as noted above, 20 valid fetch slots containing up to 80 instructions can be in flight between the registers 127 and the end of the processor's pipeline, where control flow is finally resolved. The register 127 logic is capable of backing up the contents of the registers to the state associated with any of these 80 instructions in a single cycle. The register logic 127 preferably places instructions into the integer or floating-point issue queues 128, 129, from which they are later issued to functional units 130 or 136 for execution.

The integer instruction queue 128 preferably includes capacity for 20 integer instructions. The integer instruction queue 128 issues instructions at a maximum rate of four instructions per cycle. The specific types of instructions processed through queue 128 include: integer operate commands, integer conditional branches, unconditional branches (both displacement and memory formats), integer and floating-point load and store commands, Privileged Architecture Library ("PAL") reserved instructions, integer-to-floating-point and floating-point-integer conversion commands.

Referring still to FIGS. 1a and 1b, the integer execution unit ("Ebox") 130 includes arithmetic logic units ("ALUs") 131, 132, 133, and 134 and two integer register files 135. Ebox 130 preferably comprises a 4-path integer execution unit that is implemented as two functional-unit "clusters" labeled 0 and 1. Each cluster contains a copy of an 80-entry, physical-register file and two subclusters, named upper ("U") and lower ("L"). As such, the subclusters 131–134 are labeled U0, L0, U1, and L1. Bus 137 provides cross-cluster communication for moving integer result values between the clusters.

The subclusters 131–134 include various components that are not specifically shown in FIG. 1a. For example, the subclusters preferably include four 64-bit adders that are used to calculate results for integer add instructions, logic units, barrel shifters and associated byte logic, conditional branch logic, a pipelined multiplier for integer multiply operations, and other components known to those of ordinary skill in the art.

Each entry in the integer instruction queue 128 preferably asserts four request signals—one for each of the Ebox 130 subclusters 131, 132, 133, and 134. A queue entry asserts a request when it contains an instruction that can be executed by the subcluster, if the instruction's operand register values are available within the subcluster. The integer instruction queue 128 includes two arbiters—one for the upper subclusters 132 and 133 and another arbiter for the lower subclusters 131 and 134. Each arbiter selects two of the possible 20 requesters for service each cycle. Preferably, the integer instruction queue 128 arbiters choose between simultaneous requesters of a subcluster based on the age of the request—older requests are given priority over newer requests. If a given instruction requests both lower subclusters, and no older instruction requests a lower subcluster, then the arbiter preferably assigns subcluster 131 to the instruction. If a given instruction requests both upper subclusters, and no older instruction requests an upper subcluster, then the arbiter preferably assigns subcluster 133 to the instruction.

The floating-point instruction queue 129 preferably comprises a 15-entry queue and issues the following types of instructions: floating-point operates, floating-point conditional branches, floating-point stores, and floating-point register to integer register transfers. Each queue entry preferably includes three request lines—one for the add pipeline, one for the multiply pipeline, and one for the two store pipelines. The floating-point instruction queue 129 includes three arbiters—one for each of the add, multiply, and store pipelines. The add and multiply arbiters select one requester per cycle, while the store pipeline arbiter selects two requesters per cycle, one for each store pipeline. As with the integer instruction queue 128 arbiters, the floating-point instruction queue arbiters select between simultaneous requesters of a pipeline based on the age of the request—older request are given priority. Preferably, floating-point store instructions and floating-point register to integer register transfer instructions in even numbered queue entries arbitrate for one store port. Floating-point store instructions and floating-point register to integer register transfer instructions in odd numbered queue entries arbitrate for the second store port.

Floating-point store instructions and floating-point register to integer register transfer instructions are queued in both the integer and floating-point queues. These instructions wait in the floating-point queue until their operand register values are available from the floating-point execution unit ("Fbox") registers. The instructions subsequently request service from the store arbiter. Upon being issued from the floating-point queue 129, the instructions signal the corresponding entry in the integer queue 128 to request service. Finally, upon being issued from the integer queue 128, the operation is completed.

The integer registers 135, 136 preferably contain storage for the processor's integer registers, results written by instructions that have not yet been retired, and other information as desired. The two register files 135, 136 preferably contain identical values. Each register file preferably includes four read ports and six write ports. The four read ports are used to source operands to each of the two subclusters within a cluster. The six write ports are used to write results generated within the cluster or another cluster and to write results from load instructions.

The floating-point execution queue ("Fbox") 129 contains a floating-point add, divide and square-root calculation unit 142, a floating-point multiply unit 144 and a register file 146. Floating-point add, divide and square root operations are handled by the floating-point add, divide and square root calculation unit 142 while floating-point operations are handled by the multiply unit 144.

The register file 146 preferably provides storage for 72 entries including 31 floating-point registers and 41 values written by instructions that have not yet been retired. The Fbox register file 146 contains six read ports and four write ports (not specifically shown). Four read ports are used to source operands to the add and multiply pipelines, and two read ports are used to source data for store instructions. Two write ports are used to write results generated by the add and multiply pipelines, and two write ports are used to write results from floating-point load instructions.

Referring still to FIG. 1a, the Mbox 150 controls the L1 data cache 160 and ensures architecturally correct behavior for load and store instructions. The Mbox 150 preferably contains a datastream translation buffer ("DTB") 151, a load queue ("LQ") 152, a store queue ("SQ") 153, and a miss address file ("MAF") 154. The DTB 151 preferably comprises a fully associative translation buffer that is used to store data stream address translations and page protection information. Each of the entries in the DTB 151 can map 1, 8, 64, or 512 contiguous 8-KB pages. The allocation scheme preferably is round robin, although other suitable schemes could also be used. The DTB 151 also supports an 8-bit Address Space Number ("ASN") and contains an Address Space Match ("ASM") bit. The ASN is an optionally implemented register used to reduce the need for invalidation of cached address translations for process-specific addresses when a context switch occurs.

The LQ 152 preferably is a reorder buffer used for load instructions. It contains 32 entries and maintains the state associated with load instructions that have been issued to the Mbox 150, but for which results have not been delivered to the processor and the instructions retired. The Mbox 150 assigns load instructions to LQ slots based on the order in which they were fetched from the instruction cache 110, and then places them into the LQ 152 after they are issued by the integer instruction queue 128. The LQ 152 also helps to ensure correct memory reference behavior for the processor.

The SQ 153 preferably is a reorder buffer and graduation unit for store instructions. It contains 32 entries and maintains the state associated with store instructions that have been issued to the Mbox 150, but for which data has not been written to the data cache 160 and the instruction retired. The Mbox 150 assigns store instructions to SQ slots based on the order in which they were fetched from the instruction cache 110 and places them into the SQ 153 after they are issued by the instruction cache 110. The SQ 153 holds data associated with the store instructions issued from the integer instruction unit 128 until they are retired, at which point the store can be allowed to update the data cache 160. The LQ 152 also helps to ensure correct memory reference behavior for the processor.

The MAF 154 preferably comprises a 16-entry file that holds physical addresses associated with pending instruction cache 110 and data cache 160 fill requests and pending input/output ("I/O") space read transactions.

Processor 100 preferably includes two on-chip primary-level ("L1") instruction and data caches 110 and 160, and single secondary-level, unified instruction/data ("L2") cache 180 (FIG. 2b). The L1 instruction cache 110 preferably is a 64-KB virtual-addressed, two-way set-associative cache. Prediction is used to improve the performance of the two-way set-associative cache without slowing the cache access time. Each instruction cache block preferably contains a plurality (preferably 16) instructions, virtual tag bits, an address space number, an address space match bit, a one-bit PALcode bit to indicate physical addressing, a valid bit, data and tag parity bits, four access-check bits, and predecoded information to assist with instruction processing and fetch control.

The L1 data cache 160 preferably is a 64 KB, two-way set associative, virtually indexed, physically tagged, write-back, read/write allocate cache with 64-byte cache blocks. During each cycle the data cache 160 preferably performs one of the following transactions: two quadword (or shorter) read transactions to arbitrary addresses, two quadword write transactions to the same aligned octaword, two non-overlapping less-than quadword writes to the same aligned quadword, one sequential read and write transaction from and to the same aligned octaword. Preferably, each data cache block contains 64 data bytes and associated quadword ECC bits, physical tag bits, valid, dirty, shared, and modified bits, tag parity bit calculated across the tag, dirty, shared, and modified bits, and one bit to control round-robin set allocation. The data cache 160 is organized to contain two sets, each with 512 rows containing 64-byte blocks per row (i.e., 32-KB of data per set). The processor 100 uses two additional bits of virtual address beyond the bits that specify an 8-KB page in order to specify the data cache row index. A given virtual address might be found in four unique locations in the data cache 160, depending on the virtual-to-physical translation for those two bits. The processor 100 prevents this aliasing by keeping only one of the four possible translated addresses in the cache at any time.

The L2 cache 180 preferably is a 1.75-MB, seven-way set associative write-back mixed instruction and data cache.

Preferably, the L2 cache holds physical address data and coherence state bits for each block.

Referring now to FIG. 1b, the L2 instruction and data cache control unit ("Cbox") 170 controls the L2 instruction and data cache 190 and system ports. As shown, the Cbox 170 contains a fill buffer 171, a data cache victim buffer 172, a system victim buffer 173, a cache miss address file ("CMAF") 174, a system victim address file ("SVAF") 175, a data victim address file ("DVAF") 176, a probe queue ("PRBQ") 177, a requester miss-address file ("RMAF") 178, a store to I/O space ("STIO") 179, and an arbitration unit 181.

The fill buffer 171 preferably in the Cbox is used to buffer data that comes from other functional units outside the Cbox. The data and instructions get written into the fill buffer and other logic units in the Cbox process the data and instructions before sending to another functional unit or the L1 cache. The data cache victim buffer ("VDF") 172 preferably stores data flushed from the L1 cache or sent to the System Victim Data Buffer 173. The System Victim Data Buffer ("SVDB") 173 is used to send data flushed from the L2 cache to other processors in the system and to memory. Cbox Miss-Address File ("CMAF") 174 preferably holds addresses of L1 cache misses. CMAF updates and maintains the status of these addresses. The System Victim-Address File ("SVAF") 175 in the Cbox preferably contains the addresses of all SVDB data entries. Data Victim-Address File ("DVAF") 176 preferably contains the addresses of all data cache victim buffer ("VDF") data entries.

The Probe Queue ("PRBQ") 177 preferably comprises a 18-entry queue that holds pending system port cache probe commands and addresses. This queue includes 10 remote request entries, 8 forward entries, and lookup L2 tags and requests from the PRBQ content addressable memory ("CAM") against the RMAF, CMAF and SVAF. Requestor Miss-Address Files ("RMAF") 178 in the Cbox preferably accepts requests and responds with data or instructions from the L2 cache. Data accesses from other functional units in the processor, other processors in the computer system or any other devices that might need data out of the L2 cache are sent to the RMAF for service. The Store Input/Output ("STIO") 179 preferably transfer data from the local processor to I/O cards in the computer system. Finally, arbitration unit 181 in the Cbox preferably arbitrates between load and store accesses to the same memory location of the L2 cache and informs other logic blocks in the Cbox and computer system functional units of the conflict.

Referring still to FIG. 1b, processor 100 preferably includes dual, integrated RAMbus memory controllers 190 (Zbox0 and Zbox1). Each Zbox 190 controls 4 or 5 channels of information flow with main memory (not specifically shown). Each Zbox preferably includes a front-end directory in-flight table ("DIFT") 191, a middle mapper 192, and a back end 193. The front-end DIFT 191 performs a number of functions such as managing the processor's directory-based memory coherency protocol, processing request commands from the Cbox 170 and Rbox 200, sending forward commands to the Rbox, sending response commands to and receiving packets from the Cbox and Rbox, and tracking up to 32 in-flight transactions. The front-end DIFT 191 also sends directory read and write requests to the Zbox and conditionally updates directory information based on request type, Local Probe Response ("LPR") status and directory state.

The middle mapper 192 maps the physical address into RAMbus device format by device, bank, row, and column. The middle mapper 192 also maintains an open-page table to track all open pages and to close pages on demand if bank conflicts arise. The mapper 192 also schedules RAMbus transactions such as timer-base request queues. The Zbox back end 193 preferably packetizes the address, control, and data into RAMbus format and provides the electrical interface to the RAMbus devices themselves.

The Rbox 200 provides the interfaces to as many as four other processors and one I/O controller (not specifically shown). The I/O controller provides an interface to at least one input and/or output device such as a keyboard, display, or storage device. The inter-processor interfaces are designated as North ("N"), South ("S"), East ("E"), and West ("W") and provide two-way communication between adjacent processors.

Figure 2:
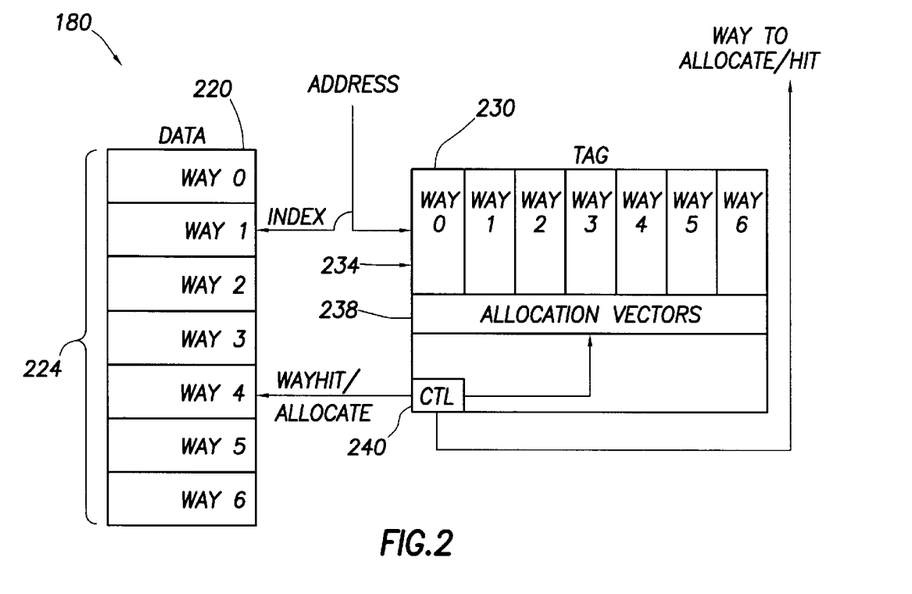
FIG. 2 shows a detailed block diagram of the set-associative L2 cache system in the microprocessor of FIGS. 1a and 1b having at least one fast lane and at least one slow lane.

FIG. 2 shows the L2 cache 180 in more detail. As shown, the cache 180 preferably contains a data buffer 220 and a tag buffer 230. The L2 cache 180 preferably is a seven-way, set associative cache, although the number of ways is arbitrary. As such, the data buffer 220 includes seven ways 224, WAY0–WAY6. The tag buffer 230, in which tags are stored, preferably also includes seven ways 234, as well as allocation vector buffer 238 and a control logic 240 coupled to the allocation vector buffer 238 and ways 234. The data buffer 220 contains storage for a cache block of data for each tag in the tag buffer 230.

In accordance with the preferred embodiment of the invention, one or more of the seven ways 224 is designated as a "fast" lane(s), while the remaining ways are designated as "slow" lanes. The term fast lane means that data stored in the fast lane is not expected to be needed any time soon and thus is made immediately available for replacement. The slow lanes are those ways that are used in accordance with an allocation scheme that favors retaining data in cache for longer periods of time (e.g., LRU). A suitable such allocation is described below. Thus, a cache block in the fast lane can and likely will be allocated even before a longevity-favoring allocation scheme would otherwise have allocated the block.

As such, the preferred embodiment implements two different allocation schemes for different portions of the cache. One portion of the cache has an allocation scheme that lets cache blocks be evicted immediately because the data is not expected to be needed again. Another portion of the cache has an allocation scheme that retains the data in the cache until it becomes "old." This latter allocation scheme may be an LRU scheme, the scheme explained above with reference to FIGS. 2–4, or any other desired allocation scheme. By implementing two allocation schemes in different portions of the cache, the overall performance of the system can be increased.

Figure 5:
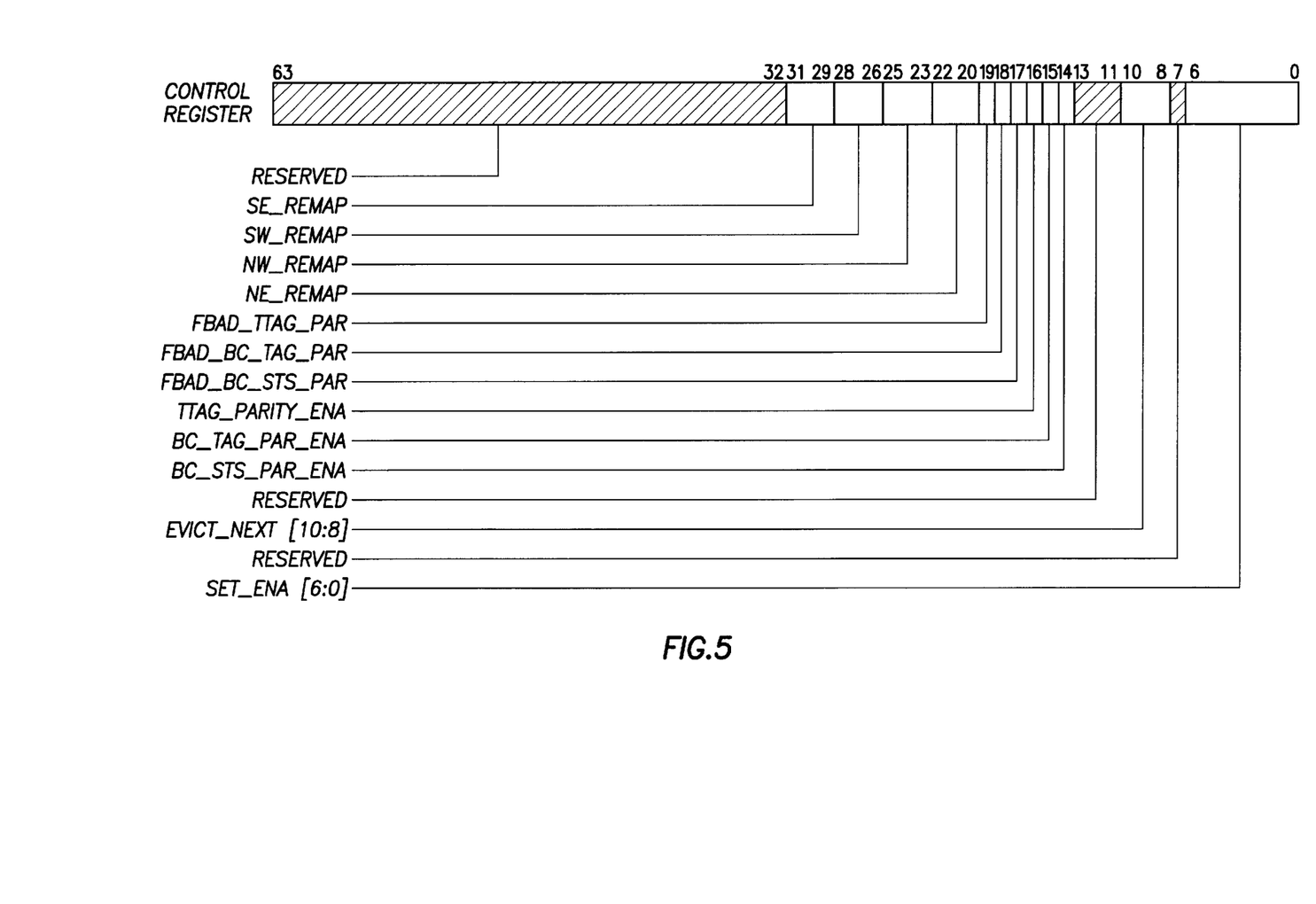
FIG. 5 shows a control register through which fast lane(s) are designated.

In one embodiment of the invention, which way is designated to be the fast lane is programmable via an internal processor control register shown in FIG. 5. The register shown may reside in the Cbox 170 or elsewhere in processor 100. The control register shown in FIG. 5 preferably is a 64 bit register with the bit definitions as shown. The bit definitions relevant to the preferred embodiment are the EVICT_NEXT[10:8] and SET_ENA[6:0] fields.

The three EVICT_NEXT[10:8] bits encode preferably one of the seven ways as being the fast lane. The fast lane designated by the EVICT_NEXT bits should be enabled via the SET$_{ENA}$[6:0] bits. The seven SET_ENA bits are individually programmed to enable or disable one or more of the seven possible ways. In accordance with the preferred embodiment, exactly one of the seven ways is designated the fast lane, but in other embodiments of the invention, two or more ways can be designated fast lanes as well.

Any data can be stored in the fast lane. However, data that is loaded in the fast lane preferably should be data that is not expected to be needed again. Data targeted by prefetch commands may be one suitable type of data appropriate for the fast lane in the cache. In accordance with the preferred embodiment of the invention, six types of prefetch commands are implemented. Those prefetches are shown in Table 1 below.

TABLE 1

PREFETCH COMMANDS

| COMMAND | DESCRIPTION |
| --- | --- |
| Load | Loads data from main memory or L2 cache into a slow lane of L1 cache; cache block marked clean |
| Load_Evict Next | Same as load but data is loaded into the fast lane of the cache |
| Load/Store | Loads data from memory or L2 cache into L1 cache (slow lane); cache block marked dirty |
| Load/Store_Evict Next | Same as Load/Store prefetch but data is loaded into fast lane of cache |
| Write-Hint 64 | Invalidates an entire cache block (64 bytes in the preferred embodiment) in a slow lane |
| Write-Hint 64_Evict Next | Same as Write-Hint 64, but applies to fast lane |

Thus, there preferably are three types of prefetch commands: load, load and store, and store. The data prefeteched by each of these prefetch commands can be stored either into the slow lanes or the fast lane. The slow lane prefetch commands are load, load/store and write-hint 64, where as the fast lane prefetch commands are the load_evict next, load/store_evict next, and write-hint 64_evict next. The "evict next" command designator means that once the data targeted by the prefetch command is loaded into the cache, that cache block can be evicted next. That is, the cache block can be allocated immediately and not wait to become old. In accordance with the preferred embodiment of the invention, the prefetch commands contain an operational code ("opcode") that designates whether a slow or fast lane is to be used as a repository for the prefetch data. As such when the processor 100 decodes an evict next prefetch command, the processor loads the data into the way designated by the EVICT_NEXT[10:8] bits in the control register in FIG. 5 as being the fast lane.

By loading all evict next prefetch command data into the fast lane, the cache blocks in the fast lane will tend to be allocated sooner than otherwise would be the case with conventional allocation scheme. This is acceptable and, in fact, preferred, because the fast lane data is data that likely will not be needed again in the near future. By earmarking such data for immediate allocation, cache blocks in the other six slow lanes can remain in cache longer thereby improving the overall performance of the system.

Prefetch command data that is to be loaded into one or more of the slow lanes preferably is not loaded into the fast lane. Any suitable technique for encouraging this result is acceptable. For example, the fast lane can be designated to be WAY6 (the seventh way out of 7 WAYS). Slow lane data preferably is allocated, explained below, by allocating ways beginning with WAY0 and increasing toward WAY6 until a way is found to allocate. Accordingly, slow lane data naturally will not be loaded into the fast lane if any of the slow lanes are available for replacement. As a corollary to this scheme, the fast lane can be used for slow lane data if necessary. Alternatively, once the processor 100 decodes a slow lane prefetch command (load, load/store, and write-hint 64), the processor reads the EVICT_NEXT[10:8] and SET_ENA[6:0] bits in the control register of FIG. 5 and determines that the data should be placed in one or more of the enabled ways, but preferably not in the way designated as fast by the EVICT_NEXT[10:8] bits.

As explained above, the processor 100 implements two cache allocation policies. One policy is applied to the slow lane(s) and another policy is applied to the fast lane(s). The cache allocation policy applied to the slow lanes preferably is the allocation scheme discussed in commonly owned, co-pending application, Ser. No. 09/653,092, filed Aug. 31, 2000 and entitled "A High Performance Way Allocation Strategy for a Multi-Way Associative Cache System," which is incorporated herein by reference in its entirety. The explanation of that cache allocation scheme is, to a large extent, repeated below for convenience. After the following explanation of the processor's preferred cache allocation scheme from copending application "A High Performance Way Allocation Strategy for a Multi-Way Associative Cache System," a discussion will be provided in which this allocation scheme is modified to accommodate the provision for fast lane data in the L2 cache.

Figure 3:
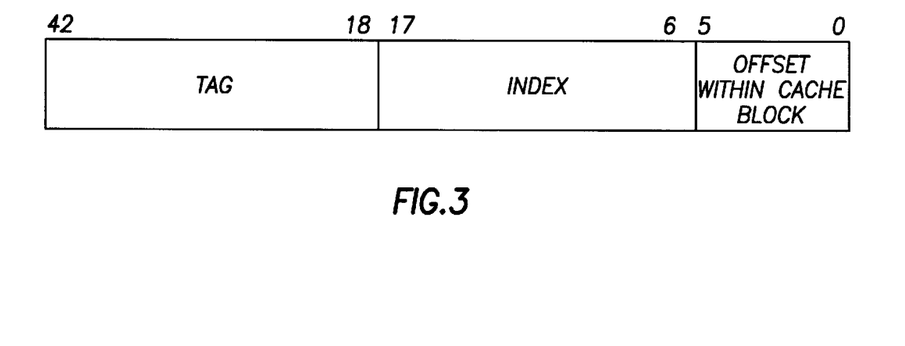
FIG. 3 identifies the various fields in a memory address.

Referring briefly to FIG. 3, an exemplary address is shown to include at least three fields. As shown, the address preferably comprises 43 bits. Bits 6–17 preferably contain a 12-bit index value which indexes one tag out of 4K (4096) tags in each way 234. Each tag in the ways 234, in turn, is associated with a cache block in data buffer 220. Bits 0–5 contain an offset to a byte within the cache block referenced by the index value. A tag is provided in bits 18–42.

Figure 4:
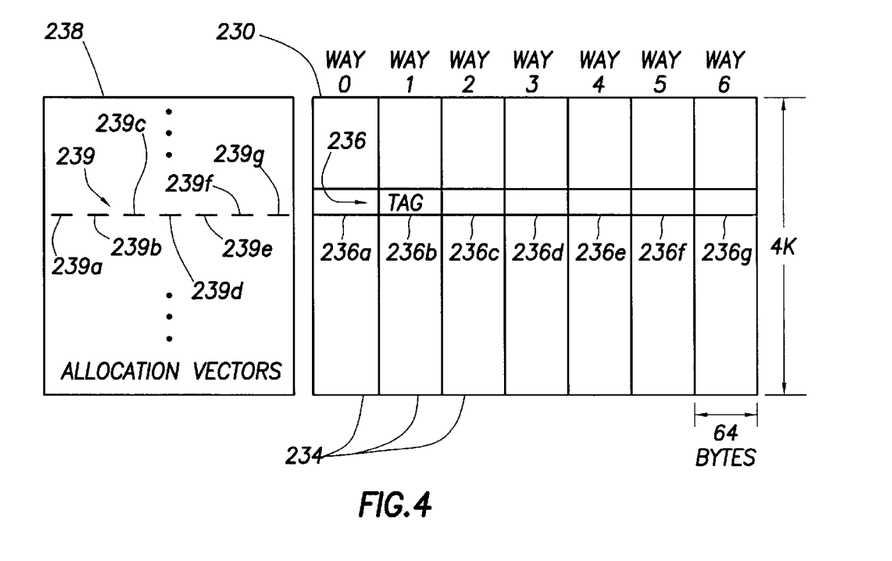
FIG. 4 provides more detail regarding a preferred cache allocation scheme.

Referring to FIG. 4, each way 234 in the tag buffer 230 preferably comprises 4K tags with each tag comprising 25 bits. It should be noted that the tags stored in tag buffer 230 may include the tag value itself, as well as additional (e.g., 6) bits of tag control information. Allocation vector buffer 238 preferably includes a multibit vector for each set of corresponding cache tags in the tag ways 234. That is, there preferably is one allocation vector for each set of tags across the ways. By way of example, FIG. 4 shows an allocation vector 239 that corresponds to a set of tags 236. Because the L2 cache comprises a seven way, set associative cache, each allocation vector preferably includes seven bits, with each bit in an allocation vector associated with a single tag in the set of tags corresponding to that vector. As such, each index value references a corresponding set of tags in tag buffer 230, an allocation vector in buffer 238 and a corresponding set of cache blocks in data buffer 220.

Referring to the exemplary allocation vector 239 and corresponding set of tags 236, each of the seven tags (identified as 236a–236g) in the set 236 is referenced using the same index value from an address (FIG. 3). As such, there is an index value that indexes the tags 236 and also identifies the allocation vector 239 corresponding to the set of associated tags. Each bit in vector 239 (identified as bits 239a–239g) preferably corresponds to one of the seven tags 236a–236g in the set 236 of tags corresponding to that vector. For example, allocation vector bit 239 corresponds to tag 236a, allocation vector bit 239b corresponds to tag 236b, allocation vector bit 239c corresponds to tag 239c, and so on. Allocation vector buffer 238 preferably contains an allocation vector for each set of corresponding tags in the tag buffer 230. Because there are 4K sets of tags and associated cache blocks in the seven ways, there preferably are 4K allocation vectors.

The use of the allocation vectors 238 will now be described with reference to FIGS. 2–4. Each bit in each allocation vector indicates the preference level for whether the corresponding cache block should be allocated for replacement by new data. Although the polarity chosen is immaterial, a logic 0 for a given allocation vector bit indicates that the associated cache block is available for replacement. A logic 1 indicates that the associated cache block should not be used for replacement if another bit in the same vector has a 0 value. The following preferred set of rules are applied to implement the cache allocation policy.

Upon system initialization each bit in the allocation vectors is cleared (set to 0). When a way allocation is required (e.g., on a cache miss to a full cache), the control logic 240 performs a "find first zero" operation on the allocation vector referenced by the index value in the address. A find first zero operation includes examining the allocation vector from the left (e.g., beginning with bit 239*a* in the example of FIG. 4) and proceeding to the right examining each bit in the vector until the first bit is found that has a zero value. The direction of examination alternatively could be from the right to the left or any other suitable predetermined or programmable order. If all the bits in the vector are 0, which is the case immediately after initialization, the first zero bit will be the left-most bit (e.g., bit 239*a*). The first bit found to have a zero value identifies the way to be allocated. Upon allocating that way, the allocation vector bit identifying that way is set to 1.

The next time a memory reference is made with the same index value that requires a cache allocation, the control logic 240 will again examine the same allocation vector using the find first zero operation. This time a different way will be allocated because a different allocation bit will be selected (the previously selected bit is not a logic 0 and thus will not be selected). The way associated with the newly selected allocation bit is the way that is allocated and the associated allocation bit is set to 1.

If setting the allocation bit would result in all of the allocation bits in the given vector to be set to all 1s, then the control logic 240 preferably clears all bits to 0. Otherwise, with all bits at logic 1, the find first zero operation on a subsequent memory reference to the same index will fail as there will not be any 0-value allocation vector bits. Alternatively, rather than clearing all of the bits in the vector to 0, the control logic 240 could set the last zero bit to 1 and the remaining 6 bits in the vector to logic 0. Although slightly more complex, this alternative approach retains some history information to improve the performance of the L2 cache allocation methodology.

In some cases it may be necessary to "invalidate" a cache block within a way. For example, if a copy of a cache block is given to another processor in the system and the receiving processor is granted permission to modify the cache block, the processor originating the cache block should invalidate its copy of the data to indicate that its copy is unreliable (i.e., the data may be old because another processor has modified the data). In such cases when a cache block is invalidated, the preferred cache allocation scheme clears to 0 the allocation vector bit associated with the way being invalidated. This frees up that cache block to be allocated.

If a cache hit occurs to a particular index and way, the allocation bit 239 associated with that way preferably is set to a logic 1. Doing so helps frequently accessed data advantageously to remain in cache longer than it might have otherwise.

Referring again to FIG. 2, the memory address is provided to tag buffer 230 and is used by the control logic 240 to examine the tag buffer ways and allocation vectors. The index portion of the address is provided to the data buffer 220. The data buffer 220 uses the index value to locate the associated cache block in the seven ways. In the event the control logic determines a cache miss has occurred and the cache is full, an allocation is necessary. In this case the control logic applies the rules identified above and determines which way to allocate for the new memory reference. The control logic 240 provides the number of the way to be allocated to the data buffer 220 via the way hit/allocate signal. In this case, the control logic 240 also asserts the way number to allocate to the Cbox 170 via the way to allocate/hit signal. In the case of a cache hit as determined by the control logic 240, no allocation is necessary and the control logic provides the way number of the targeted cache block to the data buffer 220 so that the hit cache block can be retrieved from the L2 cache 180. The control logic 240 also provides the way number associated with the cache hit to the Cbox 170.

The preceding cache allocation strategy preferably is modified as discussed below to accommodate fast lane cache data. The modification preferably includes not changing the allocation vector bit corresponding to the fast way when data is loaded into the corresponding index of the fast lane. As described above, the allocation strategy involves finding the first 0 bit in the relevant allocation vector beginning with the bit corresponding to WAY0 and proceeding toward WAY6. Preferably, the fast lane is designated as WAY6 via the EVICT_NEXT bits (FIG. 5). Accordingly, any slow lane data will be allocated to one of the six slow lanes (WAY0 to WAY5) due to the find first from left nature of the slow lane allocation scheme. If, however, all of the slow lane cache blocks associated with a particular index value have been allocated (i.e., all allocation vector bits are 1), the fast lane cache block can be allocated if desired for what otherwise would have been slow lane data. Alternatively, a further modification to the slow lane allocation scheme described above can include resetting the slow lane allocation vector bits to 0 once the last of the slow lane ways is allocated. This would help ensure that slow lane data is only allocated to one of the six slow lanes and fast lane data is allocated to the fast lane.

In accordance with another embodiment, two (or more) fast lanes are implemented in the cache. Having two fast lanes can be advantageous when needing to load multiple streams of data into the cache. For example, if the processor is executing two software programs and one program is in a loop containing one prefetch load command and the other program is also in a loop having another prefetch load command, the processor will load both sets of prefetch data into the cache. If one stream of prefetch data is being loaded into the cache faster than the other stream, the faster stream may soon catch up to the beginning of the slower stream and begin overwriting the slower stream or be forced to stall until additional fast lane cache blocks become available. This problem can be avoided by using two fast lanes.

Figure 6:
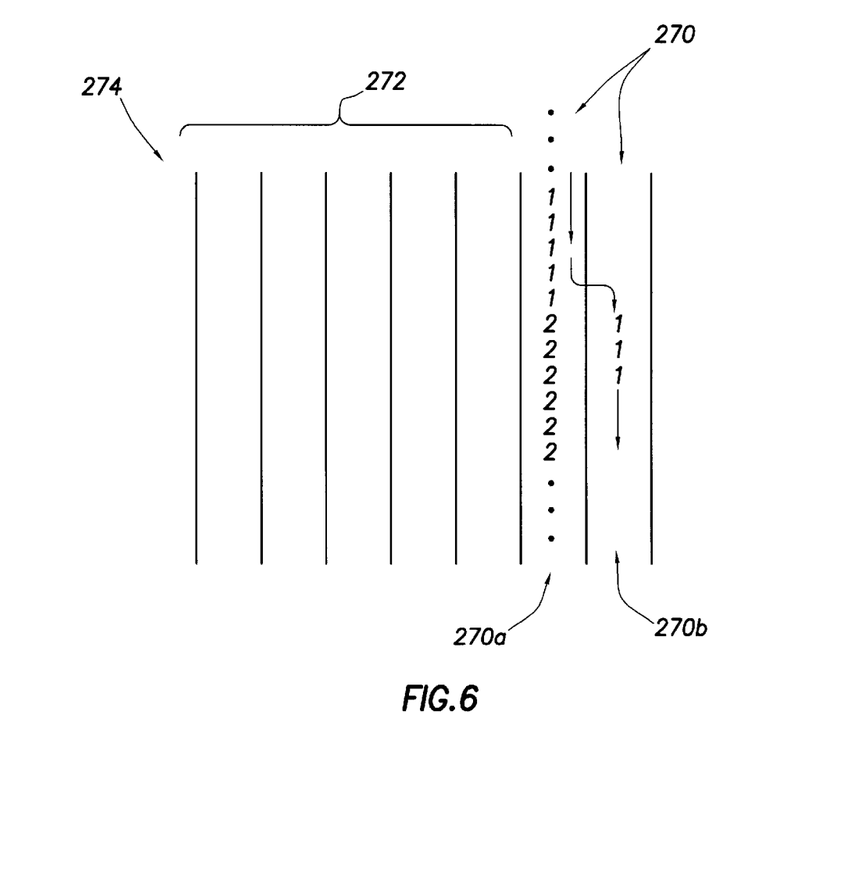
FIG. 6 shows an embodiment of the L2 cache system in which two fast lanes are implemented.

The two fast lanes (e.g., WAYS 5 and 6, FIG. 2) can be members of an "LRU set" meaning that eviction for a particular index is in accordance with a least recently used-type protocol. As such, as one stream of prefetch data is being loaded into WAY 5, if that stream catches up to beginning of the second stream of prefetched data, the first stream can skip over to the other fast lane (WAY6) and continue loading into that lane. FIG. 6 shows this embodiment conceptually. The cache 274 includes 5 slow lanes 272 and 2 fast lanes 274. Two streams of data are being loaded into the fast lane 270*a*. Those streams are designated "1" and "2." As shown, data stream 1 catches up to data stream 2 and switches over the other fast lane 270b and continues loading there. The processor switches over to the other fast lane because, once it encounters the index pointing to the beginning of data stream 2, the least recently used way will be fast lane 270b.

An allocation scheme such as that described above involving a find first 0 allocation bit from the left can be used for both the slow and fast lanes. Two separate allocation vectors can be provided for each index. One vector is used for the slow lane allocation and the other vector used for the fast lane allocation.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A computer system, comprising:

a CPU core;

a multi-way cache system coupled to said CPU core wherein at least one way is designated to implement an eviction policy that makes data contained in said at least one way to be available for replacement immediately upon storage in the way, and all other ways implement an eviction policy that favors retaining data for longer periods of time than said at least one way; and a control register that is programmable to specify which of the ways in the cache system is designated to implement the eviction policy that makes data contained in said at least one way available for replacement immediately upon storage in said way.

2. The computer system of claim 1 wherein said cache system includes two ways designated to implement an eviction policy that makes data contained in said two ways to be available for replacement immediately upon storage in the ways.

3. The computer system of claim 1 wherein prefetch command data is loaded into the at least one way.

4. The computer system of claim 1 wherein command opcodes include encoded information that directs the cache system to load data into either said at least one ways designated to have the eviction policy that makes data contained in said at least one way to be available for replacement immediately upon storage in the way or into one of the other ways.

5. A cache system, comprising:

a multi-way storage tag portion; and a multi-way data storage portion;

wherein a way of the data storage portion implements a first allocation scheme that permits data to be allocated immediately after storage therein and the remaining ways of the data storage portion implement a second allocation scheme that is different from the first allocation scheme; and further comprising a register that is programmable to designate which way in the multi-way data storage portion is to implement the first allocation scheme.

6. The cache system of claim 5 wherein two ways in said storage portion implement the first allocation scheme.

7. The cache system of claim 5 wherein prefetch command data is loaded into the way implements the first allocation scheme.

8. The cache system of claim 5 wherein data stored in the way that implements the first allocation scheme includes data not likely to be needed again.

9. The cache system of claim 8 wherein data stored in the ways that implement the second allocation scheme includes data that may be needed again.

10. A cache system, comprising:

a multi-way storage tag portion;

a multi-way data storage portion including a first group of storage portion ways and a second group of storage portion ways, wherein a first allocation policy is implemented to allocate the ways comprising the first group of storage portion ways and a different allocation policy is implemented to allocate the ways comprising the second group of storage portion ways; and control bits that are configurable to identify which of the ways comprise the second group of storage portion ways.

11. The cache system of claim 10 wherein the first allocation policy includes a least recently used policy.

12. The cache system of claim 10 wherein the second allocation policy includes designating a storage element for replacement immediately after loading that storage element with data.

13. The cache system of claim 12 wherein the first allocation policy includes a least recently used policy.

14. The cache system of claim 12 wherein the first allocation policy includes allocating the ways in the first group starting with one of the first group ways and examining each of the first group ways in sequence until a first group way is found that has been marked for allocation.

15. The cache system of claim 10 wherein the second group of storage portion ways includes one way and the first group of storage portion ways includes more than two ways.

16. The cache system of claim 15 wherein the first group of storage portion ways includes six ways.

17. A method, comprising:

predesignating which of a plurality of ways is to implement an allocation scheme that permits data contained therein to be available for replacement immediately upon being stored in said specified way;

formulating a cache command having an operational code that designates whether data targeted by the cache command should remain in the cache or can be marked for immediate replacement;

interpreting the operational code of said cache command;

if said operational code designates that the data should remain in cache, loading the data into a first portion of the cache; or if said operational code designates that the data should be marked for replacement, loading the data into said predesignated way.

* * * * *